(12) United States Patent
Bennice et al.

(10) Patent No.: US 12,533,801 B2
(45) Date of Patent: Jan. 27, 2026

(54) TRAINING WITH HIGH FIDELITY SIMULATIONS AND HIGH SPEED LOW FIDELITY SIMULATIONS

(71) Applicant: GDM Holding LLC, Mountain View, CA (US)

(72) Inventors: Matthew Bennice, San Jose, CA (US); Paul Bechard, Ogdensburg, NY (US); Joséphine Simon, San Francisco, CA (US); Jiayi Lin, Sunnyvale, CA (US)

(73) Assignee: GDM HOLDING LLC, Mountain View, CA (US)

( * ) Notice: Subject to any disclaimer, the term of this patent is extended or adjusted under 35 U.S.C. 154(b) by 297 days.

(21) Appl. No.: 18/104,001

(22) Filed: Jan. 31, 2023

(65) Prior Publication Data
US 2024/0253215 A1    Aug. 1, 2024

(51) Int. Cl.
*B25J 9/16*    (2006.01)

(52) U.S. Cl.
CPC ............ *B25J 9/163* (2013.01); *B25J 9/1656* (2013.01); *B25J 9/1671* (2013.01); *G05B 2219/40515* (2013.01)

(58) Field of Classification Search
CPC ...... B25J 9/1671; B25J 9/1605; B25J 9/1656; B25J 9/163; B25J 9/161; B25J 9/1679; G05B 19/41885; G05B 2219/40515; G05B 2219/40518; G05B 2219/40499;
(Continued)

(56) References Cited

U.S. PATENT DOCUMENTS

| 11,461,519 | B2 | 10/2022 | Lu |
| 11,584,008 | B1* | 2/2023 | Beckman ............... B25J 9/1697 |
| 2017/0347061 | A1 | 11/2017 | Wang et al. |
| 2019/0091859 | A1 | 3/2019 | Wen |
| 2019/0096105 | A1* | 3/2019 | Osotio .................... G06T 19/00 |

(Continued)

FOREIGN PATENT DOCUMENTS

| WO | WO-2024056892 A1 * | 3/2024 | ............. G06N 3/006 |
| WO | WO-2024104485 A1 * | 5/2024 | ............. G06F 30/27 |

OTHER PUBLICATIONS

Aydin, "General Multi-Fidelity Framework for Training Artificial Neural Networks With Computational Models", 2019, Frontiers in Materials 6, https://www.researchgate.net/publication/332467922_General_Multi-Fidelity_Framework_for_Training_Artificial_Neural_Networks_With_Computational_Models (Year: 2019).*

(Continued)

*Primary Examiner* — Bao Long T Nguyen
*Assistant Examiner* — Tanner L Cullen
(74) *Attorney, Agent, or Firm* — Gray Ice Higdon (57) ABSTRACT

Implementations are provided for training a robot control policy for controlling a robot. During a first training phase, the robot control policy is trained using a first set of training data that includes (i) training data generated based on simulated operation of the robot in a first fidelity simulation, and (ii) training data generated based on simulated operation of the robot in a second fidelity simulation, wherein the second fidelity is greater than the first fidelity. When one or more criteria for commencing a second training phase are satisfied, the robot control policy is further trained using a second set of training data that also include training data generate based on simulated operation of the robot in the first and second fidelity simulations, which has a ratio therebetween lower than that in the first set of training data.

17 Claims, 6 Drawing Sheets

(58) Field of Classification Search
CPC ...... G06F 18/2148; G06N 3/08; G06N 3/092; G06N 3/044; G06N 20/00
See application file for complete search history.

(56) References Cited

U.S. PATENT DOCUMENTS

| | | | |
|---|---|---|---|
| 2021/0103815 A1* | 4/2021 | Jeong | G06N 3/084 |
| 2021/0357692 A1 | 11/2021 | Traut | |
| 2022/0016763 A1* | 1/2022 | Chen | B25J 9/163 |
| 2022/0245928 A1 | 8/2022 | Tan et al. | |
| 2022/0383092 A1* | 12/2022 | Zhao | G06N 3/04 |

OTHER PUBLICATIONS

Wolters Kluwer "Increasing Fidelity and Realism in Simulation" Retrieved from https://www.wolterskluwer.com/en/expert-insights/increasing-fidelity-and-realism-in-simulation. 17 pages, dated 2022.

Wu et al., "Multi-fidelity Hierarchical Neural Processes" arXiv: 2206.04872v1 [cs.LG] 10 pages, dated Jun. 10, 2022.

Aydin et al., "General Multi-Fidelity Framework for Training Artificial Neural Networks With Computational Models" Front. Mater. 6:61. doi: 10.3389/fmats.2019.00061, 14 pages, dated Apr. 17, 2019.

European Patent Office; Search Report issued in Application No. 24154840.3; 16 pages; dated Jun. 14, 2024.

Leguizamo, D.F. et al.; Deep Reinforcement Learning for Robotic Control with Multi-Fidelity Models; ScienceDirect; 6 pages; dated 2021.

Qui, J. et al.; Low-Cost Multi-Agent Navigation via Reinforcement Learning with Multi-Fidelity Simulator; IEEE; 10 pages; dated 2021.

* cited by examiner

TRAINING WITH HIGH FIDELITY SIMULATIONS AND HIGH SPEED LOW FIDELITY SIMULATIONS

BACKGROUND

Robot control policies are trained to enable robots to navigate through environments autonomously, including interacting with (e.g., touching, engaging with, operating, dodging, etc.) objects perceived in those environments. These robot control policies often take the form of machine learning models, such as reinforcement learning policies. Training robot control policies can be costly and time consuming. While the robot control policies can be bootstrapped using imitation learning (IL), it is still necessary to further train the robot control policies via myriad training episodes of robot activity.

The resources required for training the robot control policies can be mitigated somewhat by simulating the robot's behavior in a simulated environment during at least some of the training. However, accurately simulating the behavior of robots in a simulated environment during training can still require substantial resources. For instance, accurately simulating an environment can involve several computationally expensive components, such as physics simulation, rendering detailed assets in the environment, etc. As such, simulating a robot in a simulated environment can consume large amounts of computing resources, increasing the time and/or computing power required for training robot control policies. Since training typically involves very large numbers of iterations of simulating the robot in a simulated environment, the resources required to train the robot control policy (e.g. time taken to train) can expand dramatically.

SUMMARY

Implementations are described herein for training robot control policies using both high speed, low fidelity simulation and high fidelity simulation. A robot control policy can be trained initially with a larger amount of training data generated from the low fidelity simulation than from the high fidelity simulation, such that a general policy can be learned. As the learning of the robot control policy slows (or other criteria being satisfied), the ratio of training data generated based on the high fidelity simulation can be increased in discrete steps, such that finer details can be learned. For instance, initially, the robot control policy can be trained with 100% of the training data being generated based on the low fidelity simulation. When it is determined that training of the robot control policy has slowed, the training can transition such that the robot control policy is trained with 95% of the training data being generated based on the low fidelity simulation and 5% being generated based on the high fidelity simulation. This process can repeat until the robot control policy is being trained with as much as 100% of the training data being generated based on the high fidelity simulation. In some implementations, the training can further transition to involve real world training data, for instance, in amounts increasing in discrete steps similarly to as described in relation to the training data generated based on the high fidelity simulation.

Techniques described herein give rise to various technical advantages and benefits. For instance, simulating a physical or real-world environment at a lower fidelity consumes less computational resources (e.g. computing time, energy consumed, computing power, etc.) as compared to simulating the environment at a higher fidelity. The fidelity of a simulation can be indicative of how accurately the simulation simulates the real world, where lower fidelity means less accuracy. As such, by generating at least some of the training data using the low fidelity simulation for training of the robot control policy, computational resources can be conserved (e.g. as compared to training the robot control policy entirely with training data generated based on the high fidelity simulation). In addition, since the robot control policy can be trained more quickly, the engineering cycle time for developing a robot can be reduced. Furthermore, since the robot control policy is also trained with training data generated based on the high fidelity simulation (or even with training data generated based on real world environment/operation), performance of the trained robot control policy cannot be substantially adversely effected.

In addition, whilst it can be theoretically possible to generate training data based on a plurality of simulations of incrementally increasing levels of fidelity (e.g. rather than just a high fidelity simulation and a low fidelity simulation), doing so can not realize various potential benefits. For instance, the fidelity of a given simulation can be determined based on various different parameters. As such, it may not be trivial to determine which parameters are affecting the learning of the robot control policy during training, and thus which parameters should be modified to alter the fidelity of the simulation during further training. Utilizing two (or more) discrete levels of fidelity for the simulation (e.g. fastest and most accurate), and processing training data generated based on the two discrete levels of fidelity in the same way during the training, requires less configuration encoding and simplifies the training of the robot control policy.

Robot control policies are generally configured for selecting actions to be performed by a robot interacting with a physical or real-world environment to perform a robotic task, such as opening a door, picking up an object and placing it down, and so on. In particular, a robot control policy can be configured to receive, as input, an observation (i.e., data characterizing a state of the environment), and to process the observation to generate an output indicative of a probability distribution over possible actions to be performed by the robot in response to the observation. The robot can then process the actions (e.g. with a robot control stack) to implement the actions.

As discussed herein, simulation can be used for the training phase, such that the observations provided to the robot control policy are generated based on a simulated environment, and a state of the environment prior to, during, and after the actions being performed by the simulated robot are simulated. The robot control policy can thus be trained based on whether the selected action(s) lead towards performance of a given robot task (e.g. based on the resulting simulated state). For instance, the robot control policy can be trained using reinforcement learning (RL) over a large number of iterations, using both high fidelity simulation and low fidelity simulation, such that when the robot control policy selects an action which leads towards performance of a given robot task, a reward is used to train the robot control policy.

As discussed herein, the robot control policy can be trained using training data generated based on both a high fidelity simulation and a low fidelity simulation. The proportion (or ratio) of the training data generated based on the low fidelity simulation to the training data generated based on the high fidelity simulation can initially be weighted heavily in favor of the low fidelity simulation (e.g. 100% low fidelity simulation, 0% high fidelity simulation). When one or more criteria are satisfied, the training can transition to a second phase (e.g., a second batch of training examples) such that the proportion of training data generated based on the high fidelity simulation can be less weighted in favor of the low fidelity simulation (e.g. 95% low fidelity simulation, 5% high fidelity simulation). This process can repeat until, for instance, the training data is entirely generated based on the high fidelity simulation.

The relative proportions (or ratios) of the training data during each phase (e.g., batch of training examples) of the training can be imposed by, for each training instance, stochastically selecting, based on a predetermined probability distribution (e.g. 95% low fidelity simulation, 5% high fidelity simulation) according to the given phase, whether to use the high fidelity simulation or the low fidelity simulation to generate the training data. For instance, following the above example, in the second phase, the probability distribution can be such that the low fidelity simulation will be selected 95% of the time, and the high fidelity simulation will be selected 100% of the time.

The criteria for transitioning between phases can include, for instance, a determination that the learning of the robot control policy has slowed during the current phase. For instance, assuming the robot control policy is trained using reinforcement learning (RL), it can be determined to transition to the next phase of training when the slope of a reward function over time deviates down from a previous average by at least a threshold amount.

The fidelity of a simulation can be indicative of how accurately the simulation simulates the real world. In other words, a high fidelity simulation can more accurately simulate the real world relative to a low fidelity simulation. For instance, relative to a high fidelity simulation, a low fidelity simulation can be rendered with a lower resolution, such that sensor data (e.g. an image of the simulated environment) captured by a simulated robot has a lower resolution. In some implementations, the low fidelity simulation can be rendered at a lower resolution than the expected resolution of sensors of the robot. As such, the sensor data can be upscaled to match the expected resolution of the sensors of the robot. As another example, the assets of the low fidelity simulation can be rendered with simpler geometry (e.g. assets with fewer polygons) than the high fidelity simulation; rendering of shadows, transparency, shading and/or reflections can be simplified or bypassed; etc.

Additionally or alternatively, the low fidelity simulation can include relatively coarser physics simulation. For instance, simulation of soft body dynamics can be bypassed. Additionally or alternatively, the low fidelity simulation can be sampled with a lower frequency than the high fidelity simulation, such that time intervals between the state of the simulated environment being determined is greater for the low fidelity simulation than for the high fidelity simulation. In some implementations, the low fidelity simulation can be generated based on modifying (e.g. simplifying) assets from the high fidelity simulation, prior to rendering of the simulation. In some additional or alternative implementations, the low fidelity simulation can be generated based on modifying one or more parameters (e.g. physics quality, rendering quality, sampling frequency, etc.) of the simulator providing the low fidelity simulation.

In various implementations, a method may be implemented using one or more processors and may include: during a first phase of training a robot control policy for controlling a robot: training the robot control policy based on a first set of training data, wherein the first set of training data comprises (i) training data generated based on simulated operation of the robot in a first fidelity simulation, and (ii) training data generated based on simulated operation of the robot in a second fidelity simulation, wherein the second fidelity is greater than the first fidelity; and determining that one or more criteria for commencing a second phase of training the robot control policy are satisfied; during the second phase of training the robot control policy: training the robot control policy based on a second set of training data, wherein the second set of training data comprises (i) training data generated based on simulated operation of the robot in the first fidelity simulation, and (ii) training data generated based on simulated operation of the robot in the second fidelity simulation, wherein the ratio of training data generated based on simulated operation of the robot in the first fidelity simulation to training data generated based on simulated operation of the robot in the second fidelity simulation in the second set of training data is lower than in the first set of training data.

In various implementations, the method may include, subsequent to training the robot control policy, causing the robot control policy to be deployed in controlling a robot. In various implementations, the robot control policy may be trained over a plurality of training phases, wherein during each subsequent training phase the robot control policy is trained with a set of training data with a lower ratio of training data generated based on simulated operation of the robot in the first fidelity simulation to training data generated based on simulated operation of the robot in the second fidelity simulation than in the preceding training phase.

In various implementations, the one or more criteria for commencing the second phase of training the robot control policy may include a determination that improvement of the robot control policy from training with the first set of training data has deviated below a threshold.

In various implementations, the method may include: during a third phase of training the robot control policy: training the robot control policy based on a third set of training data, wherein the third set of training data comprises (i) training data generated based on real world operation of a robot using the robot control policy, and (ii) training data generated based on simulated operation of the robot in the second fidelity simulation.

In various implementations, the method may include: for each training episode of the first set of training data: selecting the second fidelity simulation or the first fidelity simulation based on a probability distribution corresponding to a predefined ratio of the first set of training data; generating training data for the training episode based on simulated operation of the robot with the selected one of the second fidelity simulation or the first fidelity simulation, and for each training episode of the second set of training data: selecting the second fidelity simulation or the first fidelity simulation based on a probability distribution corresponding to a predefined ratio of the second set of training data; and generating training data for the episode based on simulated operation of the robot in the selected one of the second fidelity simulation or the first fidelity simulation.

In various implementations, generating the training data may include causing performance of one or more actions by the robot, based on the robot control policy, in order to further completion of a task. In various implementations, training the robot control policy may include performing reinforcement learning to train the robot control policy based on rewards or penalties determined from whether the one or more actions cause furtherance of completion of the task.

In various implementations, the training data may include one or more of: sensor data captured by one or more sensors of the robot, and state information indicative of a state of the robot and/or the environment. In various implementations, the first fidelity simulation may be generated based on modifying one or more assets of the second fidelity simulation.

In various implementations, the first fidelity simulation may be generated based on modifying one or more parameters of a renderer configured to render the simulation of the environment and/or a simulator configured to simulate the simulation of the environment.

In various implementations, the first fidelity simulation may be rendered with a lower resolution than the second fidelity simulation. Generating training data based on the first fidelity simulation may include: capturing sensor data at the lower resolution of the first fidelity simulation; and upscaling the sensor data to a resolution expected by the robot control policy.

In various implementations, the first fidelity simulation may be simulated with coarser physics simulation than the second fidelity simulation and/or the first fidelity simulation is sampled with lower frequency than the second fidelity simulation. In various implementations, the generating the first fidelity simulation may include bypassing rendering of one or more of: shading, shadows, transparent materials, and reflections.

Other implementations can include a non-transitory computer readable storage medium storing instructions executable by a processor to perform a method such as one or more of the methods described above. Yet another implementation can include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
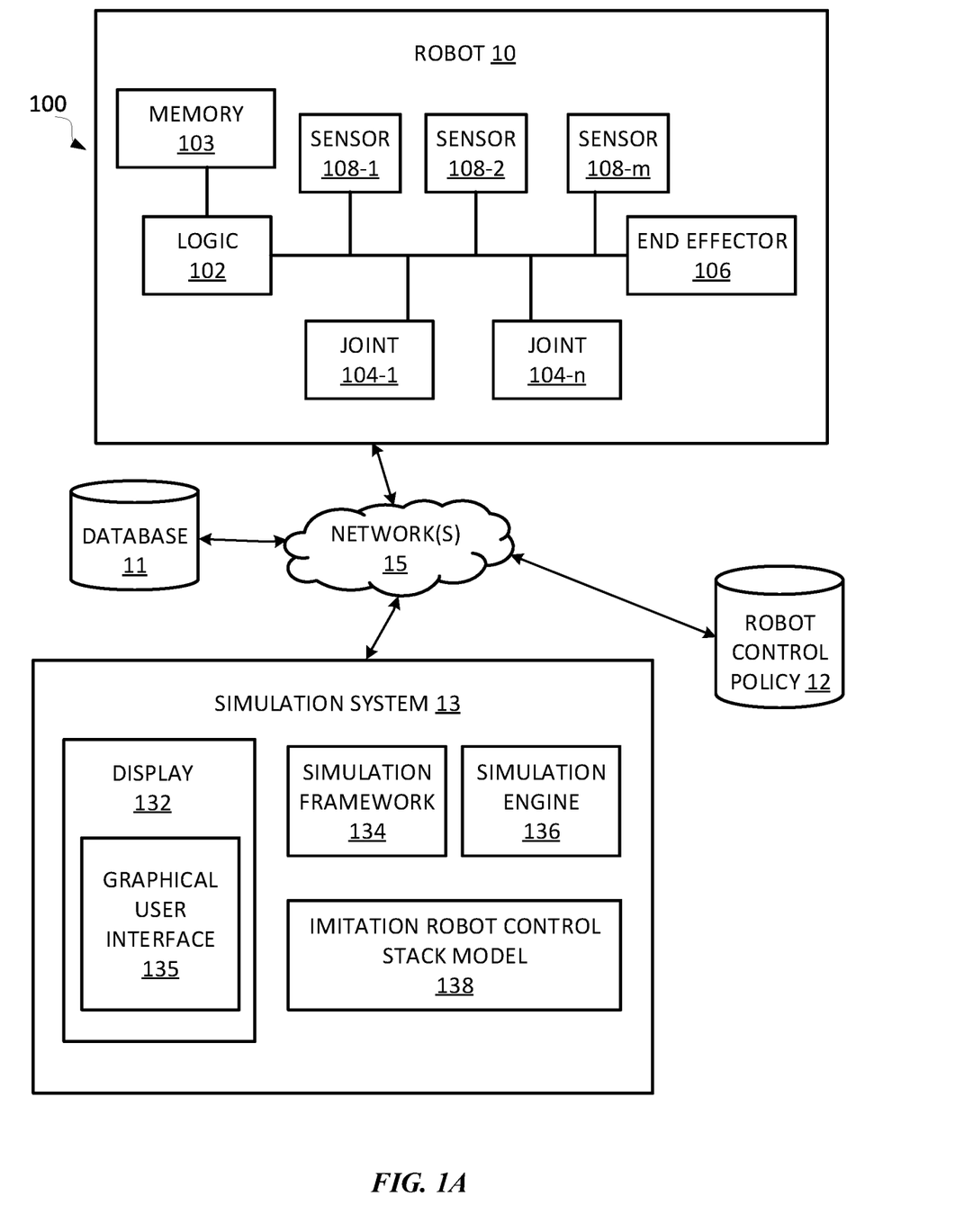
FIG. 1A schematically depicts an example environment in which disclosed techniques can be employed, in accordance with various implementations.
Figure 1B:
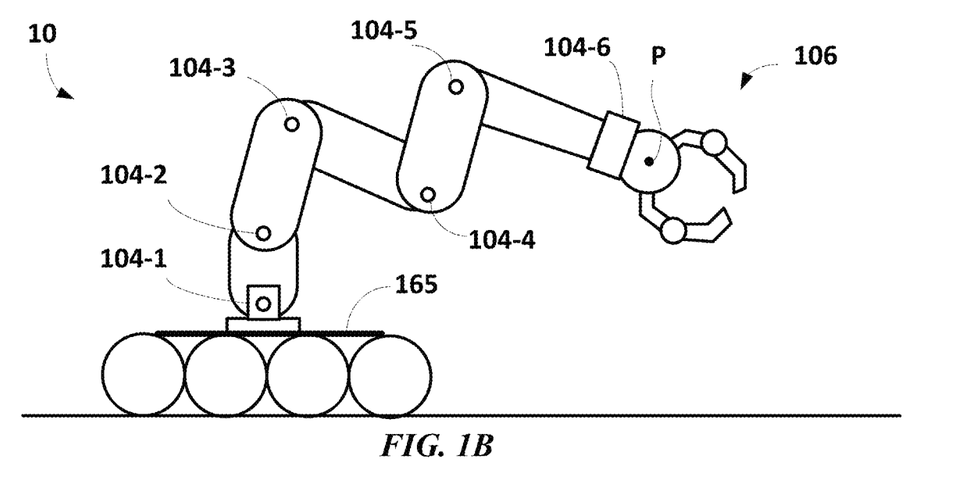
FIG. 1B depicts an example robot, in accordance with various implementations.

FIG. 1A is a schematic diagram of an example environment 100 in which selected aspects of the present disclosure can be practiced in accordance with various implementations. As shown in FIG. 1A, the environment 100 can include a robot 10, and a simulation system 13 for training one or more robot control policies (e.g., machine learning models) for the robot 10. The simulation system 13 may communicate with the robot 10, or access a robot control policy 12 and/or one or more database(s) 11, via one or more networks 15. The one or more networks 130 can include, for example, one or more wired or wireless local area networks ("LANs," including Wi-Fi LANs, mesh networks, Bluetooth, near-field communication, etc.) or wide area networks ("WANs", including the Internet). The robot 10 can take various forms, including but not limited to a telepresence robot (e.g., which can be as simple as a wheeled vehicle equipped with a display and a camera), a robot arm, a multi-pedal robot such as a "robot dog," an aquatic robot, a wheeled device, a submersible vehicle, an unmanned aerial vehicle ("UAV"), and so forth. One non-limiting example of a mobile robot arm is depicted in FIG. 1B.

In various implementations, the robot 10 can include a logic 102, where the logic 102 can take various forms, such as a real time controller, one or more processors, one or more field-programmable gate arrays ("FPGA"), one or more application-specific integrated circuits ("ASIC"), and so forth. In some implementations, the logic 102 can be operably coupled with a memory 103, where the memory 103 can take various forms, such as random-access memory ("RAM"), dynamic RAM ("DRAM"), read-only memory ("ROM"), Magnetoresistive RAM ("MRAM"), resistive RAM ("RRAM"), NAND flash memory, and so forth. In some implementations, the memory 103 can store the one or more trained robot control policies. In some implementations, the logic 102 and the memory 103 can be included in, or can form, a robot controller of the robot 10.

In some implementations, the logic 102 can, via one or more buses 110, be operably coupled with one or more joints 104-1 to 104-n, one or more end effectors 106, and/or one or more sensors 108-1 to 108-m (note that "m" and "n" are, respectively, positive integers greater than or equal to 1). The one or more joints 104-1 to 104-n can take forms of actuators, motors (e.g., servo motors), shafts, gear trains, pumps (e.g., air or liquid), pistons, drives, propellers, flaps, rotors, or other components that create and/or undergo propulsion, rotation, and/or motion. In some implementations, the one or more joints 104-1 to 104-n can be independently controllable. In some other implementations, the one or more joints 104-1 to 104-n, or a portion thereof, can be simultaneously controllable. In some instances, the more joints the robot 10 has, the more degrees of freedom of movement the robot 10 can have.

The one or more end effectors 106 can take forms of a variety of tools that can be operated by the robot 10 in order to accomplish various tasks. For example, the robot 10 can be equipped with a first end effector that takes the form of a claw with two opposing "fingers" or "digits", where such claw is one type of "gripper", known as an "impactive" gripper. The claw can also be a gripper of other types, including but are not limited to: "ingressive" gripper which, for instance, physically penetrates an object using pins, needles, etc., an "astrictive" gripper which, for instance, uses suction or vacuum to pick up an object, or a "contigutive" gripper which, for instance, picks up object via surface tension, freezing or adhesion. Instead of being a gripper, the first end effector, or other end effector(s) from the one or more end effectors 106, can be of other types, including but are not limited to: drills, brushes, force-torque sensors, cutting tools, deburring tools, welding torches, containers, trays, and so forth.

In some implementations, one or more of the end effector(s) 106 can be removable, and various types of modular end effectors can be installed onto the robot 10, depending on the circumstances. In some implementations where the robot 10 is a telepresence robot that cannot be equipped with end effectors, the robot 10 can include display(s) to render a visual representation of a user controlling the robot 10, and optionally can further include speaker(s) and/or microphone(s) that facilitate the robot 10 "acting" like the user.

The one or more sensors 108-1 to 108-*m* can take various forms, including but not limited to 3D laser scanners (e.g., light detection and ranging, or "LIDAR") or other 3D vision sensors (e.g., stereographic cameras used to perform stereo visual odometry) configured to provide depth measurements, two-dimensional cameras (e.g., RGB, infrared), light sensors (e.g., passive infrared), force sensors, pressure sensors, pressure wave sensors (e.g., microphones), proximity sensors (also referred to as "distance sensors"), depth sensors, torque sensors, barcode readers, radio frequency identification ("RFID") readers, radars, range finders, accelerometers, gyroscopes, compasses, position coordinate sensors (e.g., global positioning system, or "GPS"), speedometers, edge detectors, Geiger counters, and so forth. While sensors 108-1 to 1081-*m* are depicted as being integral with the robot 10, this is not meant to be limiting.

In some implementations, the simulation system 13 can include one or more computing devices to perform one or more aspects of the present disclosure. An example of such a computing device is depicted schematically in FIG. 5. In some implementations, the simulation system 13 can include one or more servers forming part of what is often referred to as a "cloud" infrastructure, or simply "the cloud."

Various modules or engines can be implemented as part of the simulation system 13 as software, hardware, or any combination of the two. For example, referring to FIG. 1A, the simulation system 13 can include a simulation engine 136 that simulates the robot 10 using a virtual robot (e.g., having one or more virtual sensors that correspond to one or more of the physical sensors 108-1 to 108-*m*), and/or that simulates a physical environment of the robot 10 using a corresponding virtual environment for the virtual robot 101. Alternatively or additionally, the simulation system 13 can include a display 132 via which a graphical user interface ("GUI") 135 is rendered/displayed. In this case, a user can interact with the GUI 135 to trigger and/or control aspects of the simulation system 13, e.g., to control the simulation engine 136 that configures the virtual robot and the virtual environment.

In various implementations, the virtual environment can include one or more virtual objects which can be observed by the one or more virtual sensors that correspond to one or more of the physical sensors 108-1 to 108-*m* of the robot 10. For example, the simulation engine 136 can be configured to simulate a 3D environment that includes a plurality of virtual objects, where the plurality of virtual objects can include, for instance, obstacles to be avoided and/or traversed by the robot 10, items to be picked up, placed, or otherwise manipulated by the robot 10, and/or other robots whose operation(s) can or can not also be simulated. Note that the virtual environment can be, but does not necessarily need to be rendered visually (e.g., on the display 132). In many cases, the virtual environment (also referred to herein as a "simulated environment") can be configured without any visual representation being provided on a display as output.

In some implementations, based on pose information determined using, e.g., information indicative of a real world pose or a simulated pose, the simulation engine 136 can simulate to provide corresponding virtual sensor(s) in the simulated environment. The simulation engine 136 can be further configured to provide sensor data that is generated from a perspective of at least one of the virtual sensors that is configured in the simulated space. As an example, suppose a virtual vision sensor is pointed with respect to a particular virtual object in the virtual environment. The simulation engine 136 can generate and/or provide simulated vision sensor data that depicts the particular virtual object as it would appear from the perspective of the virtual vision sensor in the virtual environment.

Alternatively or additionally, the simulation system 13 can include a simulation framework 134, where the simulation framework 134 can be configured to simulate operation(s) of one or more specific components of the robot 10. For instance, the simulation framework 134 can process a low-level command directed to controlling a motor controller of the robot 10. The low-level command can, for instance, include a signal to be sent to the motor controller, where the signal can cause the motor controller to perform a specific operation (e.g. rotate clockwise 10 degrees). Based on the low-level command and/or the signal, the simulation framework 134 can simulate the operation of the motor controller. In various implementations, simulation of the component(s) of the robot 10 using the simulation framework 134 can take into consideration real-life constraints of the respective components. For instance, in the case of the aforementioned motor controller, the simulation framework 134 can take into consideration a maximum rotational speed of a respective motor the motor controller is configured to control. The limitations can be, for instance, physical limitations of the particular components being simulated, or can be enforced limitations, for instance, for safety reasons.

In various implementations, the simulation engine 136 can be configured to simulate physical movement of the robot 10 based on simulation of the specific components of the robot 10 using the simulation framework 134. For instance, for a given component of the robot 10, the simulation engine 136 can determine, based on an initial position of the given component at a first time, a position of the given component in space at a second time after the first time. Optionally, the position of the given component (or other components) of the robot 10 can be determined at particular intervals (e.g. every 0.1 seconds, every 1 second, etc.). In some implementations, the position of the given component at the second time can be determined based on modeling physical parameters (e.g. gravity, friction, air resistance, tensile strength, etc.) associated with the physical environment of the robot 10. The simulation engine 136 can include a physics rendering engine (not depicted) for this purpose. Positions and characteristics of one or more of the aforementioned virtual objects in the virtual environment can also be simulated, for instance, based on whether such virtual objects are interacted with by the robot 10.

Alternatively or additionally, the simulation system 13 can include an imitation robot control stack model 138 that has been appropriately and sufficiently trained. The imitation robot control stack model 138 can be usable to imitate a robot control stack for the robot 10. The robot control stack can be, for instance, executed by the aforementioned robot controller of the robot 10 during real world operation of the robot 10 to, in response to high-level commands (e.g. move an end effector to X, Y, Z), generate low-level commands (e.g. control joint 1 to move A degrees, control joint 2 to move B degrees, etc.) to implement the high-level commands. The high-level commands can be determined by the robot 10 based on, for instance, one or more actions output by a robot control policy which can also be executed by the robot controller. Similarly, during simulation, the imitation robot control stack model 138 can be applied to process high-level commands (and/or state data) to generate low-level commands. The low-level commands can then be used by the simulation framework 134 in simulating the behavior of one or more components of the robot 10. In some implementations, the imitation robot control stack 138 can be trained so that it can be used to imitate output (e.g. parameters indicative of a simulated operation of one or more components of the robot 10) of the simulation framework 134, and/or output of the simulation engine 136 or a portion thereof (e.g. position information of each of the components at the second time).

In some implementations, the imitation robot control stack model 138 can be usable to simulate operations that can be applied to train the robot control policy 12, where after being sufficiently trained, the robot control policy 12 can be deployed to the robot 10 to in controlling operations of the robot 10. In some implementations, simulated operations by the imitation robot control stack model 138 can be stored in the one or more database(s) 11. As a non-limiting example, the one or more database(s) 11 can include a first database storing simulation by the imitation robot control stack model 138 that is of a first fidelity level, and a second database storing simulation of a second fidelity level.

FIG. 1B depicts a non-limiting example of the robot 10 in the form of a robot arm. As shown in FIG. 1B, the robot 10 can include an end effector 106, and a plurality of joints (e.g., a first joint 104-1, a second joint 104-2, a third joint 104-3, a fourth joint 104-4, a fifth joint 104-5, and a sixth joint 104-6). The end effector 106 can be in the form of a gripper claw, and be removably attached to the sixth joint 1046 of the robot 10. In this non-limiting example, six joints 104-1 to 104-6 are indicated. However, this is not meant to be limiting, and robots can have any number of joints. In some implementations, the robot 10 can be mobile, e.g., by including a wheeled base 165 or other locomotive mechanism. The robot 10, while being depicted in FIG. 1B in a particular selected configuration (i.e., a particular "pose"), can have a plurality of poses distinct from each other. In some implementations, the robot 10 can have one or more sensors (not shown, which can include but are not limited to: vision sensor, motion sensor, proximity sensor, thermal sensor, etc.)

Figure 2:
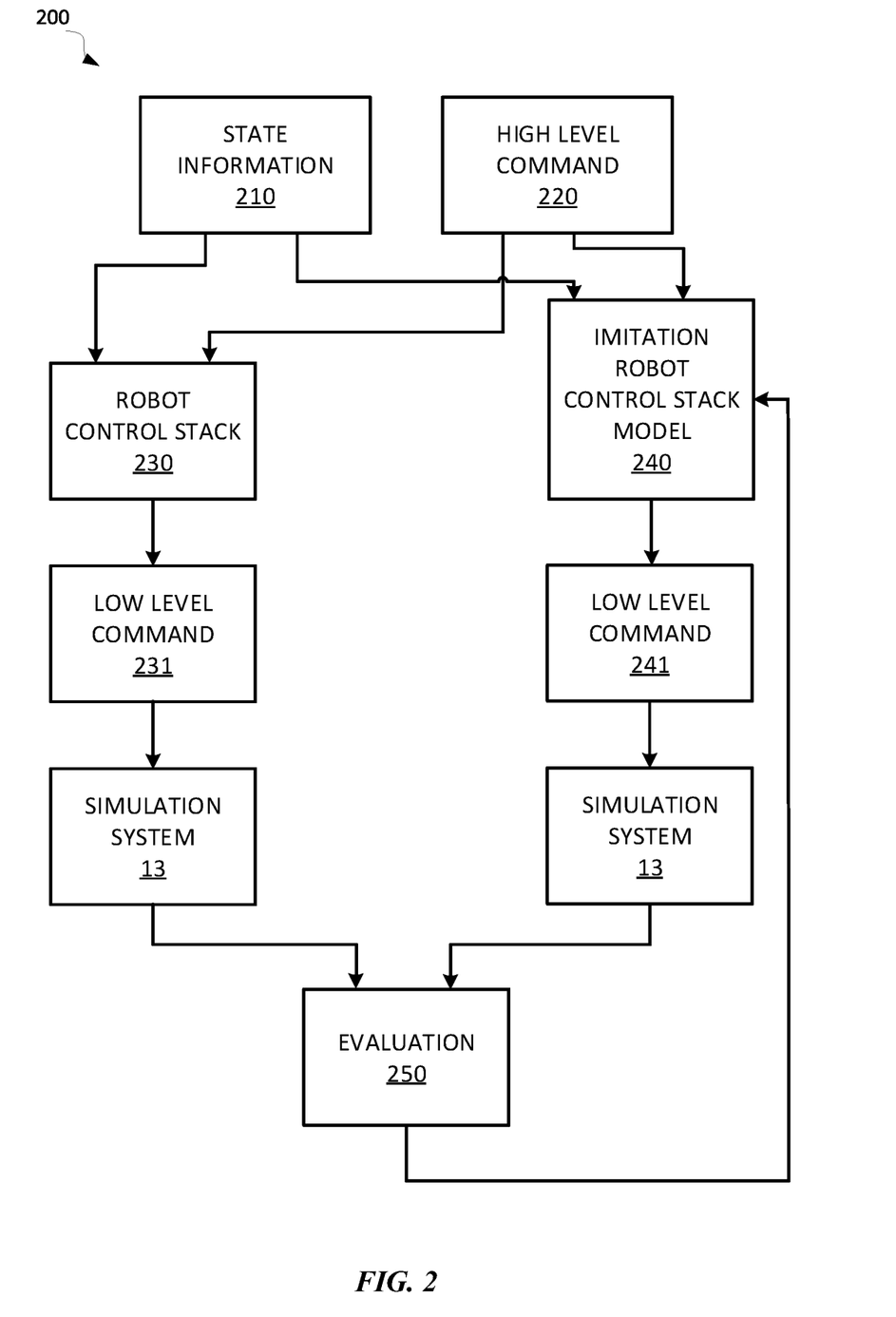
FIG. 2 schematically depicts an example of training an imitation robot control stack model, in accordance with various implementations.

FIG. 2 schematically depicts an example of training an imitation robot control stack model 240. The imitation robot control stack model 240 in FIG. 2 can share various characteristics and/or correspond to the imitation robot control stack model 138 illustrated in FIG. 1A. Training of the imitation robot control stack model 240 can involve comparing the behavior of the imitation robot control stack model 240 with a number of training examples that are indicative of behavior of a robot control stack 230. The training examples can be generated by observing the behavior of the robot control stack 230, where the robot control stack 230 can be, for instance, a full or partial robot control stack configured to be used on a real world robot, such as the robot 10 or other applicable robots.

As shown in FIG. 2, state information 210 indicative of a current state of a robot (e.g., the robot 10) and an environment containing the robot, as well as a high-level command 220 that is associated with the state information 210, can be provided to the robot control stack 230, as a pair of input data. The state information 210 can be based on, for instance, sensor data and/or prior knowledge of the state of the robot and the environment. For instance, the state information 210 can indicate a current pose of the robot. As additional non-limiting examples, the state information can include 2D or 3D image(s) depicting the robot's environment, can indicate whether the robot is close to an obstacle (e.g. such that the robot can come into contact with the obstacle such as a wall), or can indicate whether the robot is presently interacting with an object (e.g. holding a piece of paper). In some implementations, the state information 210 can be generated based on previous real world operation of the robot 10, generated based on simulated operation of the robot 10, generated by another computing device (e.g. with user input), etc. Similarly, the high-level command 220 can be generated based on previous real world operation of the robot 10, generated based on simulated operation of the robot 10, generated by another computing device (e.g. with user input), etc.

Based on processing the state information 210 and the high-level command 220, the robot control stack 230 can provide one or more low-level commands 231, as output data. The low-level command(s) 231 can be provided to implement the high-level command 220 by the robot 10. The low-level command(s) 231 can be generated during real world operation of the robot 10 and/or simulated operation of the robot 10.

The pair of input data (i.e. the state information 210 and the high-level command 220) and the corresponding output data (i.e. low-level command(s) 231) can be used to form a training example. The training example can be stored in a database for later use, or can be used directly for evaluating the performance of the imitation robot control stack model 240, as described below. As mentioned, the training example can be based on real world operation of the robot 10 and/or on simulated operation of the robot 10.

In some implementations, the low-level command(s) 231 generated for instance based on the current state of the robot 10 and the environment corresponding to the current state, can be used by the simulation system 13 to predict information indicative of a next state of the robot 10 and an environment corresponding to the next state. In some other implementations, during previous real world operation of the robot 10, information indicative of the next state (and/or associated environment) can be received, for instance, based on sensor data. As such, the training example can include the information indicative of the next state of the robot 10 (and/or the associated environment), instead of, or in addition to, the low-level command(s) 231.

In various implementations, additional pairs of input data, in addition to the above-described pair of input data, can be acquired (e.g., using one or more sensors), where each pair of the additional pairs can include: (1) state information indicating a respective state of a robot and an environment associated with the respective state of the robot, and (2) a corresponding high-level command. Each pair, of the above-described pair and the additional pairs, of input data can be processed using the robot control stack 230 to output, as corresponding output data, one or more corresponding low-level commands. In these implementations, multiple training examples can be generated, each including: a pair of input data (i.e., state information and corresponding high-level command), and corresponding output data (i.e., one or more corresponding low-level commands). Optionally, in these implementations, instead of or in addition to the corresponding output data, the multiple training examples can each include sensor data (e.g., collected by one or more real world sensors) indicating a next state of the robot, which is transitioned immediately from the respective state of the robot, and/or sensor data (e.g., collected by one or more real world sensors) indicating an environment of the robot when the robot is in the next state.

In some implementations, a plurality of training examples can be selected from the stored multiple training examples, to train the imitation robot control stack model 240. The plurality of training examples can include training examples generated from real world operation of the robot 10, simulated operation of the robot 10, or a combination thereof. Although reference is generally made to generate training examples from operation of the robot 10, it will be appreciated that training examples can be additionally or alternatively be retrieved from other real and/or simulated robots (including e.g. robots of different models).

Similarly to the robot control stack 230, the imitation robot control stack model 240 can, based on processing the state information 210 and the high-level command 220, generate one or more predicted or inferred low-level commands 241. The state information 210 and the high-level command 220 can, for instance, be retrieved from a particular training example. The imitation robot control stack model 240 can be a machine learning model of any suitable architecture, trained in any suitable manner. For instance, the imitation robot control stack model 240 can be a neural network trained using supervised, unsupervised, and/or reinforcement learning. When the imitation robot control stack model 240 is adequately trained, the one or more predicted or inferred low-level command 241 output by the imitation robot control stack model 240 should approximate the one or more low-level commands 231 (may also be referred to as "ground truth" low-level commands) output by the robot control stack 230 in response to the same input state information 210 and high-level command 220. During training of the imitation robot control stack model 240, any difference between the one or more predicted low-level commands 241 and the one or more "ground truth" low-level command 231 can be used as an error (e.g., a penalty) to train the imitation robot control stack model 240, e.g., using techniques such as stochastic gradient descent and/or back propagation.

In some implementations, the one or more low-level commands 241 output by the imitation robot control stack model 240 can be used in generating information indicative of a next state of the robot 10 and the environment. For instance, as illustrated in FIG. 2, the one or more low-level commands 241 can be used by the simulation system 13 to predict information indicative of the next state of the robot 10 and the environment. Predicting the information indicative of the next state of the robot 10 and the environment can include, for instance, simulating operation of the robot 10 based on the one or more low-level commands 241, as well as a resulting impact on the environment (e.g. if an object has been moved). In this way, comparison with training examples including information (e.g., real-world sensor data) indicative of the next state can be performed.

In some implementations, the imitation robot control stack model 240 can be trained to approximate information indicative of the next state. In these implementations, rather than providing the one or more low-level commands 241 which can be used by the simulation system 13 to provide information indicative of the next state, the imitation robot control stack model 240 can directly provide information indicative of the next state. In this way, various aspects of the simulation system 13 need not be executed, which saves time and computing resources.

The performance of the imitation control stack model 240 can be evaluated in an evaluation stage 250 based on a comparison of training example(s) and corresponding behavior of the imitation robot control stack model 240. For instance, given the same state information 210 and high-level command 220, output of the imitation robot control stack model 240 (e.g. a predicted low-level command 241, information indicative of the next state generated by the simulation system 13 based on the predicted low-level command 241, information indicative of the next state predicted directly by the imitation robot control stack model 240 based on the predicted low-level command 241, etc.) and output from the robot control stack (e.g. a low-level command 231, information indicative of the next state generated by the simulation system 13 based on the low-level command 231, information indicative of the next state generated directly by processing the low-level command 231 using the robot control stack model 230, etc.) can be compared. In particular, it can be determined whether the respective outputs are within a threshold level of similarity. Similarly, it can be determined whether the respective outputs are greater than a threshold level of difference. The results of such a comparison can then be used to train the imitation robot control stack model 240, where the training techniques, as mentioned previously, can include stochastic gradient descent, back propagation, etc.

In some implementations, the imitation robot control stack model 240 can be trained using reinforcement learning. As such, when the output of the imitation robot control stack model 240 is within a threshold similarity of the output data of a corresponding training example (i.e. having the same input data), a reward can be determined to be used as feedback to train the imitation robot control stack model 240. In other implementations, the imitation robot control stack 240 can be trained based on an error or difference between output of the imitation robot control stack 240 and output of a respective training example (i.e. having the same input data), e.g., using techniques such as stochastic gradient descent, back propagation, etc. In some implementations, the type of training can depend on the context in which the imitation robot control stack 240 will operate, e.g., a stack trained specifically for navigation versus a stack trained specifically for robot arm control.

In some implementations, the robot 10 may include a plurality of components (e.g., as illustrated in FIG. 1B) controlled by the robot control stack 230. In this case, the imitation robot control stack model 240 can be trained to predict the one or more low-level commands 241 for controlling a subset of the plurality of components of the robot 10 according to the high-level command 220. For instance, the training examples selected to train the imitation robot control stack model 240 can be relating exclusively (or primarily) to the subset of the plurality of components of the robot 10. As an example, the training examples can relate exclusively (or primarily) to locomotion of the robot 10 via the wheeled base 165, and therefore the imitation robot control stack model 240 can be trained in respect of the wheeled base 165.

Additionally or alternatively, the imitation robot control stack model 240 can be trained to output one or more low-level commands 241 in respect of the subset of components, and evaluation 250 of the behavior of the imitation robot control stack model 240 can be in respect of the subset of components. In some implementations, there can be a plurality of imitation robot control stack models 240 each trained to provide a respective low-level command 241 to control a corresponding subset of the plurality of components. In some implementations, there can be a single interface which allows the plurality of imitation robot control stack models 240 to be used to control the operation of the plurality of components of the robot 10. In this way, since a particular imitation robot control stack model 240 is concerned only with a corresponding subset of components of the robot 10, training can require fewer resources. In addition, depending on the particular application in which the robot 10 is being simulated, it may not be necessary to simulate all components of the robot 10. As such, providing an imitation robot control stack model 240 which can be used to simulate operation of the robot 10 in respect of the relevant components can simplify the simulation, thereby consuming fewer resources.

Figure 3:
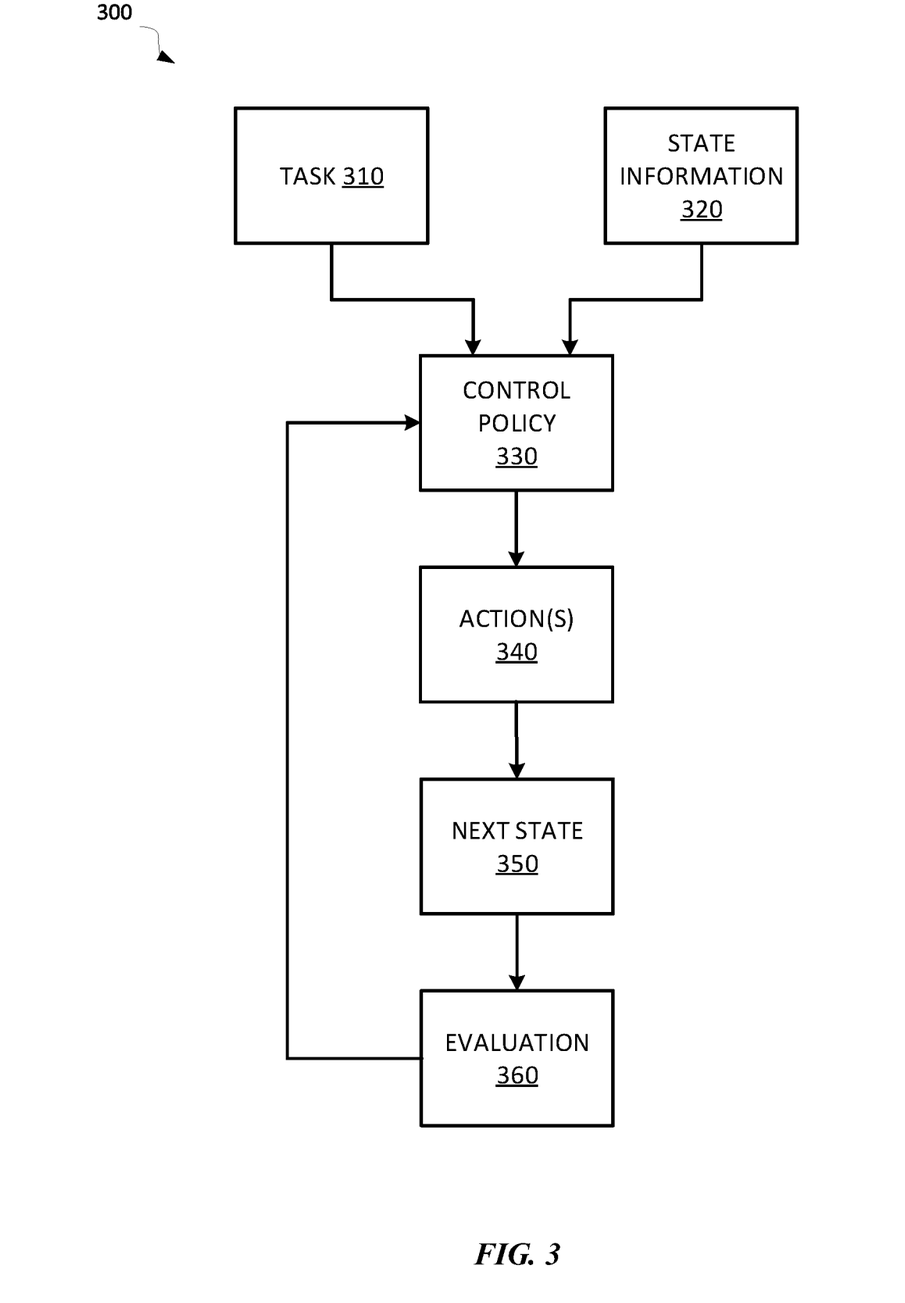
FIG. 3 schematically depicts an example of training a robot control policy, in accordance with various implementations

After being trained as illustrated above, the imitation robot control stack 240 (or other appropriately trained imitation robot control stack) can be applied to simulate operation(s) of a robot. Based on the simulated operation(s), a robot control policy can be trained for the robot 10. FIG. 3 schematically depicts an example of training a robot control policy 330, in accordance with various implementations.

Referring to FIG. 3, during training, the robot control policy 330 can process: a task 310 to be performed by a robot (e.g., the robot 10 in FIG. 1B); and corresponding state information 320, to determine one or more actions 340, so as to complete the task 310. The task 310 can be based on, for instance, user input from a user. As a non-limiting example, the task 310 can be, or can include, traveling to a particular location, opening a door, picking up an object, etc. The state information 320, similar to the state information 210 in FIG. 2, can be based on simulated sensor data or real-world sensor data, that is indicative of a corresponding state (simulated or real-world) of the robot 10 and an environment (simulated or real-world) containing the robot 10 that is in the corresponding state.

In various implementations, the robot control policy 330 can be or can include, for instance, a machine learning model (e.g., a neural network). As such, the robot control policy 330 (e.g., the neural network) can be used to process the task 310 and state information 320 as input, to generate a probability distribution over an action space of the robot 10 as output. Based on the output (i.e., the generated probability distribution), action(s), from the action space, can be selected as the aforementioned one or more actions 340 (may also be referred to as "next action(s)") to be performed by a robot (e.g., the robot 10) to complete the task 310. In some implementations, the one or more actions 340 output by the robot control policy 330 can be simulated to determine a next state 350 of the robot 10 and the environment, for instance, using the aforementioned simulation system 13. For example, the one or more actions 340 can be used to determine one or more high-level commands 220, which can be fed into the robot control stack 230 and/or processed using the trained imitation robot control stack model 240, to predict the next state 350.

In some implementations, the robot control policy 330 can be trained using reinforcement learning. In these implementations, if it is determined that the next state 350, which is predicted by the robot control stack 230 and/or trained imitation robot control stack model 138 based on the one or more actions 340, causes the completion of task 310 to be progressed at an evaluation stage 360, a corresponding reward can be awarded for the progression. If it is determined that the next state 350, which is predicted by the robot control stack 230 and/or the trained imitation robot control stack model 138 based on the one or more actions 340, causes the completion of task 310 to not be progressed at an evaluation stage 360, a corresponding penalty can be assigned for the non-progression. Such determination can be performed, for instance, by an evaluator model trained to determine feedback to train the robot control policy 330 based on whether completion of the task 310 is considered to be progressed.

In various implementations, the training of the robot control policy 330 can involve determining the next state 350 using the trained imitation robot control stack model 138, without using the robot control stack 230 or the simulation system 13. As mentioned above, processing using the trained imitation robot control stack model 138 can require fewer resources (e.g. time, computing resources, etc.) than equivalent processing using the robot control stack 230 and/or the simulation system 13. As such, in this way, the robot control policy 330 can be trained with relatively low cost. After being trained, the robot control policy 330 can be deployed in controlling a robot such as the robot 10.

In various implementation, the robot control policy 330 can be trained using training data divided into two groups, where each group includes training data generated based on simulation in a corresponding fidelity level, out of two different fidelity levels. The two different fidelity levels can include, for instance, (1) a first fidelity simulation (e.g., high speed, low fidelity simulation), and (2) a second fidelity simulation (e.g., high fidelity simulation), where the second fidelity is greater than the first fidelity.

The fidelity of a simulation can be indicative of how accurately the simulation simulates the real world. In other words, the high fidelity simulation can more accurately simulate the real world relative to the high speed, low fidelity simulation. For instance, relative to the high fidelity simulation, the low fidelity simulation can be rendered with a lower resolution, such that sensor data captured by a simulated robot (e.g. an image of the simulated environment) has a lower resolution. In some implementations, the low fidelity simulation can be rendered at a lower resolution than the expected resolution of sensors of the robot. As such, the sensor data can be upscaled to match the expected resolution of the sensors of the robot. As another example, the assets of the low fidelity simulation can be rendered with simpler geometry (e.g. assets with fewer polygons) than the high fidelity simulation; rendering of shadows, transparency, shading and/or reflections can be simplified or bypassed; etc.

Additionally or alternatively, the low fidelity simulation can include relatively coarser physics simulation. For instance, simulation of soft body dynamics can be bypassed. Additionally or alternatively, the low fidelity simulation can be sampled with a lower frequency than the high fidelity simulation, such that time intervals between the state of the simulated environment being determined is greater for the low fidelity simulation than for the high fidelity simulation. In some implementations, the low fidelity simulation can be generated based on modifying (e.g. simplifying) assets from the high fidelity simulation, prior to rendering of the simulation. In some additional or alternative implementations, the low fidelity simulation can be generated based on modifying one or more parameters (e.g. physics quality, rendering quality, sampling frequency, etc.) of the simulator providing the low fidelity simulation.

As a result, in some implementations, the first fidelity simulation is generated based on modifying one or more assets of the second fidelity simulation. In some implementations, the first fidelity simulation is generated based on modifying one or more parameters of a renderer configured to render the simulation of the environment and/or a simulator configured to simulate the simulation of the environment. In some implementations, the first fidelity simulation is rendered with a lower resolution than the second fidelity simulation, and generating training data based on the first fidelity simulation can include: capturing sensor data at the lower resolution of the first fidelity simulation; and upscaling the sensor data to a resolution expected by the robot control policy. In some implementations, the first fidelity simulation is simulated with coarser physics simulation than the second fidelity simulation and/or the first fidelity simulation is sampled with lower frequency than the second fidelity simulation. In some implementations, generating the first fidelity simulation can include bypassing rendering of one or more of: shading, shadows, transparent materials, and reflections.

The training of the robot control policy 330 for a robot (e.g., the robot 10) can be divided into a plurality of training phases. The plurality of training phases can include, for instance, a first training phase (may referred to simply as "first phase") and a second training phase (may referred to simply as "second phase"). During the first phase, the robot control policy 330 can be trained based on a first set (e.g., a batch) of training data, without interruption, to generate a general policy. The first set of training data can include: (i) training data generated based on simulated operation of the robot in the first fidelity simulation, and (ii) training data generated based on simulated operation of the robot in the second fidelity simulation. In such first set of training data, the training data generated based on simulated operation of the robot in the first fidelity simulation and the training data generated based on simulated operation of the robot in the second fidelity simulation can have a first ratio (a relatively high ratio such as 1:3), and can be shuffled together to form a discrete batch of training data.

The robot control policy 330 can be trained using the first set of training data until one or more criteria for commencing the second phase are satisfied. In some implementations, the one or more criteria for commencing the second phase of training the robot control policy 330 can include a determination that improvement of the robot control policy 330 from training with the first set of training data has deviated below a first threshold. For instance, the one or more criteria can include a determination that the learning of the robot control policy has slowed during the current phase. In this instance, assuming the robot control policy is trained using RL, the second phase of training can be commenced in response to the slope of a reward function over time deviating down from a previous average by at least a threshold amount.

During the second phase, the robot control policy 330 can be trained based on a second set of training data to generate a finer policy. The second set of training data can include: (i) training data generated based on simulated operation of the robot in the first fidelity simulation, and (ii) training data generated based on simulated operation of the robot in the second fidelity simulation. The training data generated based on simulated operation of the robot in the first fidelity simulation and the training data generated based on simulated operation of the robot in the second fidelity simulation may be shuffled together into a discrete batch of training data having a second ratio (a relatively low ratio such as 1:7) of first-to-second fidelity training data. The second ratio is lower than the aforementioned first ratio.

Optionally, in some implementations, the plurality of training phases can further include a third training phase ("third phase"). The robot control policy 330 can be trained using a third set of training data when one or more criteria for commencing the third phase are satisfied. The one or more criteria for commencing the second phase of training the robot control policy 330 can include a determination that improvement of the robot control policy 330 from training with the second set of training data has deviated below a second threshold that is smaller than the first threshold. During the third phase, the robot control policy 330 can be trained based on the third set of training data. The third set of training data can include, shuffled together into a discrete batch at a third ratio (e.g., 1:9): (i) training data generated based on simulated operation of the robot in the first fidelity simulation, and (ii) training data generated based on simulated operation of the robot in the second fidelity simulation. The third ratio may be lower than the second ratio.

In some implementations, the first set of training data can include a first plurality of training episodes (e.g., scenarios), each including training data generated based on a corresponding fidelity simulation (the first fidelity simulation or the second fidelity simulation). The robot control policy 330 may be trained using the first plurality of training episodes during the first phase. For each of the first plurality of training episodes, a first or second fidelity simulation can be stochastically selected based on a predefined ratio of first-to-second fidelity training data in the first set of training data. Training data for the respective training episode can be generated based on simulated operation of the robot with the selected second fidelity simulation or first fidelity simulation.

Similarly, the second set of training data can include a second plurality of training episodes, each including training data generated based on a corresponding fidelity simulation (the first fidelity simulation or the second fidelity simulation). The robot control policy 330 may be trained using the second plurality of training episodes during the second phase. For each of the second plurality of training episodes, a first or second fidelity simulation can be selected based on a predefined ratio of first-to-second fidelity training data in the second set of training data, and training data for the respective training episode can be generated based on simulated operation of the robot with the selected second fidelity simulation or first fidelity simulation.

In some implementations, generating the training data includes causing performance of one or more actions by the robot, based on the robot control policy, in order to further completion of a task. In some implementations, training the robot control policy includes performing reinforcement learning to train the robot control policy based on rewards or penalties determined from whether the one or more actions cause furtherance of completion of the task.

In some implementations, the training data includes one or more of: sensor data captured by one or more sensors of the robot, and state information indicative of a state of the robot and/or the environment.

Figure 4A:
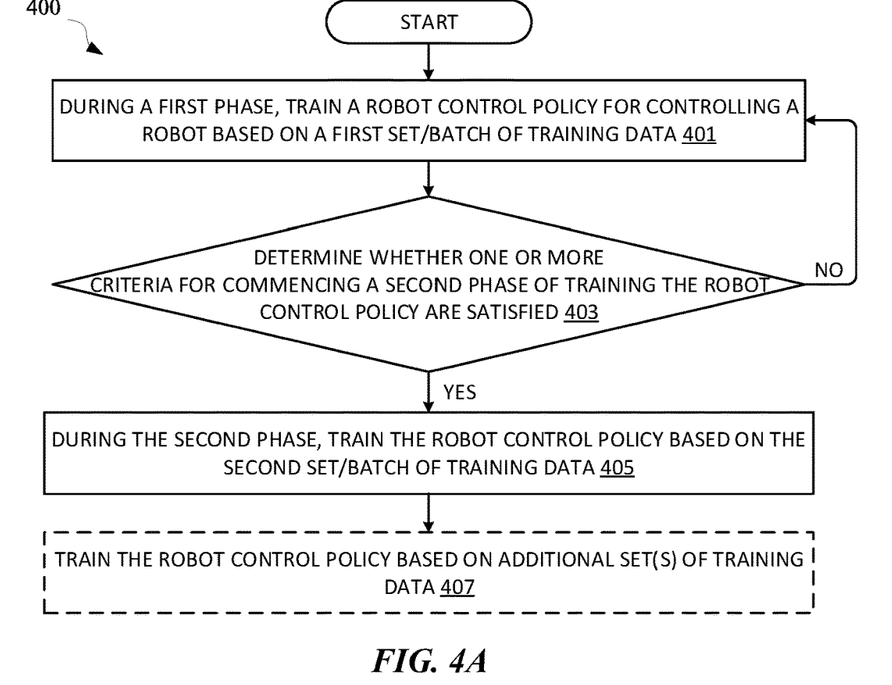
FIG. 4A depicts an example method of training a robot control policy, for practicing selected aspects of the present disclosure.
Figure 4B:
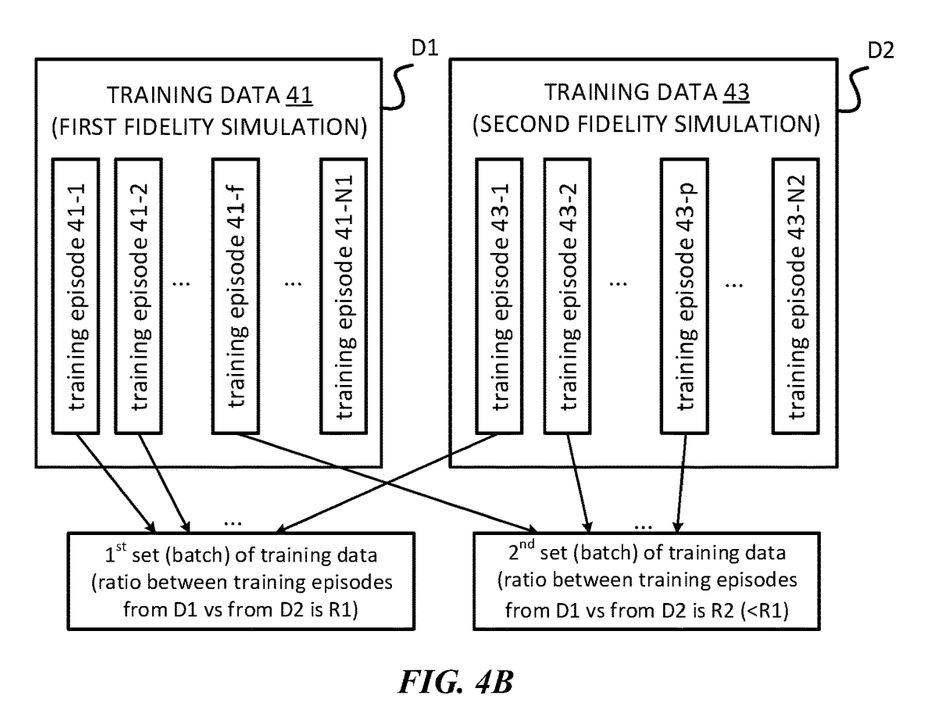
FIG. 4B depicts an example method of generating a first and second sets of training data for training the robot control policy in FIG. 4A.

FIG. 4A depicts an example method of training a robot control policy, for practicing selected aspects of the present disclosure, and FIG. 4B depicts training data used to train the robot control policy in FIG. 4A. For convenience, the operations of the flowchart in FIG. 4A are described with reference to a system that performs the operations. This system can include various components of various computer systems. For instance, some operations can be performed at the robot 10, while other operations can be performed by one or more components of the simulation system 13. Moreover, while operations of method 400 are shown in a particular order, this is not meant to be limiting. One or more operations can be reordered, omitted or added.

Referring to FIG. 4A, at block 401, the system can, during a first training phase, train a robot control policy for controlling a robot based on a first set or batch of training data. The first set of training data can include, shuffled together into a discrete batch: (i) training data (e.g., retrieved from a first database D1 in FIG. 4B that includes training data 41 generated based on simulated operation in a first fidelity) generated based on simulated operation of the robot in the first fidelity simulation, and (ii) training data (e.g., retrieved from a second database D2 in FIG. 4B that includes training data 43 generated based on simulated operation in a second fidelity) generated based on simulated operation of the robot in the second fidelity simulation. The second fidelity may be greater than the first fidelity. In the first set of training data, the training data generated based on simulated operation of the robot in the first fidelity simulation and the training data generated based on simulated operation of the robot in the second fidelity simulation can have a first ratio equal to R1.

In some implementations, referring to FIG. 4B, the first set of training data ("1st set of training data") can include a first plurality of training episodes shuffled together from training data 41 and training data 43 at the ratio R1, to train the robot control policy. Each training episode, of the first plurality of training episodes, can include training data generated based on one of: the first fidelity simulation and the second fidelity simulation. As a non-limiting example for the merely purpose of illustration, the first plurality of training episodes can include: a first training episode 41-1 can be generated based on the first fidelity simulation, a second training episode 41-2 can be generated based on the first fidelity simulation, . . . , and an Nth training episode 43-1 can be generated based on the second fidelity simulation. In this example, the first training episode 41-1, the second training episode 41-2, . . . , and the Nth training episode 43-1 can be shuffled to form a single batch of training data to train the robot control policy, without interruption.

At block 403, the system can determine whether one or more criteria for commencing a second training phase are satisfied. In some implementations, the one or more criteria for commencing the second phase of training the robot control policy include a determination that improvement of the robot control policy from training with the first set of training data has deviated below a threshold.

At block 405, in response to determining that the one or more criteria for commencing the second training phase are satisfied, the system trains the robot control policy based on a second set of training data. The second set of training data can include, shuffled together into a discrete batch of training data: (i) training data (e.g., training data 41 in FIG. 4B) generated based on simulated operation of the robot in the first fidelity simulation, and (ii) training data (e.g., training data 43 in FIG. 4B) generated based on simulated operation of the robot in the second fidelity simulation. The training data 41 and the training data 43 in the second set of training data can have a first ratio equal to R2, where R2 is less than R1.

In some implementations, the second set of training data ("$2^{nd}$ set of training data") can include a second plurality of training episodes shuffled together from training data 41 and training data 43 at the second ratio R2, to further train the robot control policy in a finer manner. Each training episode, of the second plurality of training episodes, can include training data generated based on one of: the first fidelity simulation and the second fidelity simulation. As a non-limiting example, referring to FIG. 4B, the second plurality of training episodes can include: a first training episode 41-f can be generated based on the first fidelity simulation, a second training episode 43-2 can be generated based on the second fidelity simulation, . . . , and an Nth training episode 43-p can be generated based on the second fidelity simulation.

Optionally, at block 407, the system can further train the robot control policy based on additional set(s) of training data, where each of the additional set(s) can include (i) training data (e.g., retrieved training data 41 in FIG. 4B) generated based on simulated operation of the robot in the first fidelity simulation, and (ii) training data (e.g., training data 43 in FIG. 4B) generated based on simulated operation of the robot in the second fidelity simulation. Yet, each two different sets of training data, from the additional set(s) of training data, can have different ratios between the training data generated based on simulated operation of the robot in the first fidelity simulation and the training data generated based on simulated operation of the robot in the first fidelity simulation.

For instance, the system can further determine whether one or more criteria for commencing a third training phase are satisfied. In this instance, the one or more criteria for commencing the second phase of training the robot control policy include a determination that improvement of the robot control policy from training with the first set of training data has deviated below a threshold. In response to determining that the one or more criteria for commencing the third training phase are satisfied, the system trains the robot control policy based on a third set of training data. The third set of training data can include, shuffled together in a discrete batch: (i) training data (e.g., training data 41 in FIG. 4B) generated based on simulated operation of the robot in the first fidelity simulation, and (ii) training data (e.g., training data 43 in FIG. 4B) generated based on simulated operation of the robot in the second fidelity simulation. The training data 41 and the training data 43 in the third set of training data can have a third ratio equal to R3, where R3<R2<R1.

Optionally, the system can cause the trained robot control policy to be deployed in controlling a robot. In some implementations, the robot can include a plurality of components. For instance, the plurality of components of the robot can include: one or more joints, one or more end effectors, and/or one or more sensors. After being deployed to the robot, the trained robot control policy can be applied control one or more of the plurality of components of the robot.

Figure 5:
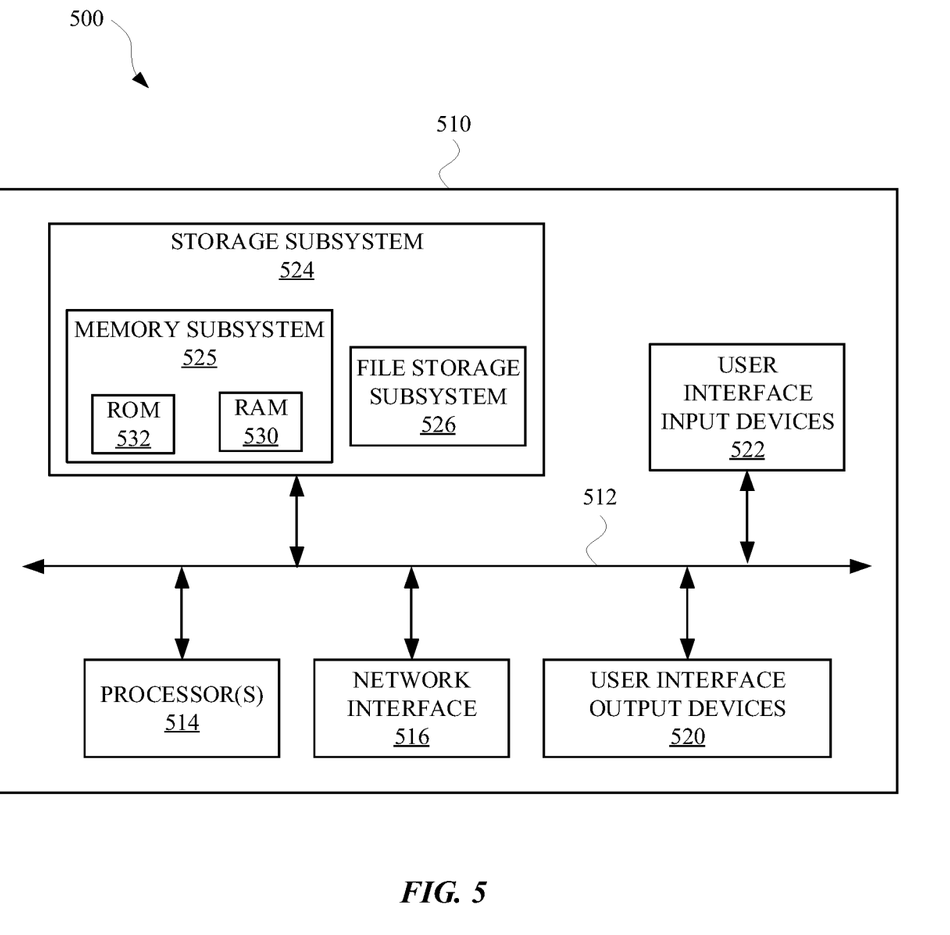
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices can include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 can include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 can include the logic to perform selected aspects of method 400, and/or to implement one or more aspects of the robot 10 or simulation system 13. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and can include a hard disk drive, a CD-ROM drive, an optical drive, or removable media cartridges. Modules implementing the functionality of certain implementations can be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem can use multiple buses.

Computer system 510 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein can be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations can be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
   during a first phase of training a robot control policy for controlling a robot:
      training the robot control policy based on a first set of training data, wherein the first set of training data comprises, in a first ratio, (i) training data generated based on simulated operation of the robot in a first fidelity simulation, and (ii) training data generated based on simulated operation of the robot in a second fidelity simulation, wherein the second fidelity is greater than the first fidelity; and
      determining that one or more criteria for commencing a second phase of training the robot control policy are satisfied, wherein the one or more criteria for commencing the second phase of training the robot control policy comprise a determination that learning of the robot control policy from training using the first set of training data has slowed by at least a first threshold;
   during the second phase of training the robot control policy:
      training the robot control policy based on a second set of training data, wherein the second set of training data comprises, in a second ratio, (i) training data generated based on simulated operation of the robot in the first fidelity simulation, and (ii) training data generated based on simulated operation of the robot in the second fidelity simulation, wherein the proportion of training data generated based on simulated operation of the robot in the first fidelity simulation relative to training data generated based on simulated operation of the robot in the second fidelity simulation in the second ratio is lower than in the first ratio; and
   subsequent to the second phase of training the robot control policy, training the robot control policy based on a third set of training data that is entirely comprised of training data generated based on simulated operation of the robot in the second fidelity simulation.

2. The method of claim 1, further comprising subsequent to training the robot control policy, causing the robot control policy to be deployed in controlling a robot.

3. The method of claim 1, wherein the robot control policy is trained over a plurality of training phases, wherein during each subsequent training phase the robot control policy is trained with a set of training data with a lower ratio of training data generated based on simulated operation of the robot in the first fidelity simulation to training data generated based on simulated operation of the robot in the second fidelity simulation than in the preceding training phase.

4. The method of claim 1, further comprising:
   for each of a plurality of training episodes of the first set of training data:
      selecting the second fidelity simulation or the first fidelity simulation based on a probability distribution corresponding to a predefined ratio of the first set of training data;

generating training data for the training episode based on simulated operation of the robot with the selected one of the second fidelity simulation or the first fidelity simulation, and for each of a plurality of training episodes of the second set of training data:
selecting the second fidelity simulation or the first fidelity simulation based on a probability distribution corresponding to a predefined ratio of the second set of training data; and
generating training data for the episode based on simulated operation of the robot in the selected one of the second fidelity simulation or the first fidelity simulation.

5. The method of claim 1, wherein generating the training data comprises causing performance of one or more actions by the robot, based on the robot control policy, in order to further completion of a task.

6. The method of claim 5, wherein training the robot control policy comprises performing reinforcement learning to train the robot control policy based on rewards or penalties determined from whether the one or more actions cause furtherance of completion of the task.

7. The method of claim 1, wherein the training data comprises one or more of:
sensor data captured by one or more sensors of the robot, and state information indicative of a state of the robot and/or the environment.

8. The method of claim 1, wherein the first fidelity simulation is generated based on modifying one or more assets of the second fidelity simulation.

9. The method of claim 1, wherein the first fidelity simulation is generated based on modifying one or more parameters of a renderer configured to render the simulation of the environment and/or a simulator configured to simulate the simulation of the environment.

10. The method of claim 1, wherein the first fidelity simulation is simulated with coarser physics simulation than the second fidelity simulation and/or the first fidelity simulation is sampled with lower frequency than the second fidelity simulation.

11. The method of claim 1, wherein the generating the first fidelity simulation comprises bypassing rendering of one or more of: shading, shadows, transparent materials, and reflections.

12. A method implemented using one or more processors, comprising:
during a first phase of training a robot control policy for controlling a robot:
training the robot control policy based on a first set of training data, wherein the first set of training data comprises, in a first ratio, (i) training data generated based on simulated operation of the robot in a first fidelity simulation, and (ii) training data generated based on simulated operation of the robot in a second fidelity simulation, wherein the second fidelity is greater than the first fidelity; and
determining that one or more criteria for commencing a second phase of training the robot control policy are satisfied, wherein the one or more criteria for commencing the second phase of training the robot control policy comprise a determination that learning of the robot control policy from training using the first set of training data has slowed by at least a first threshold;
during the second phase of training the robot control policy:
training the robot control policy based on a second set of training data, wherein the second set of training data comprises, in a second ratio, (i) training data generated based on simulated operation of the robot in the first fidelity simulation, and (ii) training data generated based on simulated operation of the robot in the second fidelity simulation, wherein the proportion of training data generated based on simulated operation of the robot in the first fidelity simulation relative to training data generated based on simulated operation of the robot in the second fidelity simulation in the second ratio is lower than in the first ratio;
wherein the first fidelity simulation is rendered with a lower resolution than the second fidelity simulation, and generating training data based on the first fidelity simulation comprises:
capturing sensor data at the lower resolution of the first fidelity simulation; and
upscaling the sensor data to a resolution expected by the robot control policy.

13. A system comprising one or more processors and memory storing instructions that, in response to execution by the one or more processors, cause the one or more processors to:
during a first phase of training a robot control policy for controlling a robot:
train the robot control policy based on a first set of training data, wherein the first set of training data comprises, in a first ratio, (i) training data generated based on simulated operation of the robot in a first fidelity simulation, and (ii) training data generated based on simulated operation of the robot in a second fidelity simulation, wherein the second fidelity is greater than the first fidelity;
determine that one or more criteria for commencing a second phase of training the robot control policy are satisfied, wherein the one or more criteria for commencing the second phase of training the robot control policy comprise a determination that learning of the robot control policy from training using the first set of training data has slowed by at least a first threshold; and
during the second phase of training the robot control policy:
train the robot control policy based on a second set of training data, wherein the second set of training data comprises, in a second ratio, (i) training data generated based on simulated operation of the robot in the first fidelity simulation, and (ii) training data generated based on simulated operation of the robot in the second fidelity simulation, wherein the proportion of training data generated based on simulated operation of the robot in the first fidelity simulation relative to training data generated based on simulated operation of the robot in the second fidelity simulation in the second ratio is lower than in the first ratio; and
subsequent to the second phase of training the robot control policy, train the robot control policy based on a third set of training data that is entirely comprised of training data generated based on simulated operation of the robot in the second fidelity simulation.

14. The system of claim 13, wherein the third set of training data comprises training data generated based on real world operation of a robot using the robot control policy.

15. The system of claim 13, wherein the first fidelity simulation is generated based on modifying one or more assets of the second fidelity simulation.

16. The system of claim 13, wherein the first fidelity simulation is generated based on modifying one or more parameters of a renderer configured to render the simulation of the environment and/or a simulator configured to simulate the simulation of the environment.

17. The system of claim 13, wherein training the robot control policy based on the first set of training data comprises:
   training the robot control policy using reinforcement learning.

\* \* \* \* \*